US010444062B2

(12) United States Patent
Zheng et al.

(10) Patent No.: US 10,444,062 B2
(45) Date of Patent: Oct. 15, 2019

(54) MEASURING AND DIAGNOSING NOISE IN AN URBAN ENVIRONMENT

(71) Applicant: Microsoft Technology Licensing, LLC, Redmond, WA (US)

(72) Inventors: Yu Zheng, Beijing (CN); Eric Chang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 264 days.

(21) Appl. No.: 15/509,521

(22) PCT Filed: Sep. 12, 2014

(86) PCT No.: PCT/CN2014/086367
§ 371 (c)(1),
(2) Date: Mar. 8, 2017

(87) PCT Pub. No.: WO2016/037346
PCT Pub. Date: Mar. 17, 2016

(65) Prior Publication Data
US 2017/0299424 A1    Oct. 19, 2017

(51) Int. Cl.
*H04W 4/02* (2018.01)
*G08G 1/01* (2006.01)
*G01H 3/10* (2006.01)

(52) U.S. Cl.
CPC ............. *G01H 3/10* (2013.01); *H04W 4/02* (2013.01); *G08G 1/0129* (2013.01)

(58) Field of Classification Search
CPC ..... G01H 3/10; G06F 17/30241; H04W 4/02; G08G 1/0129
See application file for complete search history.

(56) References Cited

U.S. PATENT DOCUMENTS

| 6,385,539 B1 * | 5/2002 | Wilson ................. G01C 21/30 340/905 |
| 2001/0022558 A1 * | 9/2001 | Karr, Jr. ................. G01S 1/026 342/450 |

(Continued)

FOREIGN PATENT DOCUMENTS

| CN | 201229662 Y | 4/2009 |
| CN | 102393246 A | 3/2012 |

(Continued)

OTHER PUBLICATIONS

Chen Cheng et al, "Fused Matrix Factorization with Geographical and Social Influence in Location-Based Social Networks", Association for the Advancement of Artificial Intelligence (www.aaai.org), 2012 (Year: 2012).*

(Continued)

*Primary Examiner* — Stephanie E Bloss
(74) *Attorney, Agent, or Firm* — Alleman Hall Creasman & Tuttle LLP

(57) ABSTRACT

A computer system measures noise in an urban environment using data records providing a location of a noise, a time stamp associated with the noise, and a noise category. Such data records are sparse with respect to both locations and time. The computer system also accesses other information that defines correlations of among different locations and among different time slots. Such correlation data can include geographic information and historical sample data. By applying this correlated information to the sparse data records about noise, the computer system can derive noise level and noise category information over a larger geographical area. Such information can be provided continually based on received data records about noise, typically in a matter of minutes after receiving the noise data for any given time slot.

20 Claims, 7 Drawing Sheets

(56) References Cited

U.S. PATENT DOCUMENTS

| | | | | |
|---|---|---|---|---|
| 2007/0063875 | A1* | 3/2007 | Hoffberg | G08G 1/0104 340/995.1 |
| 2010/0079342 | A1* | 4/2010 | Smith | G01H 17/00 342/451 |
| 2010/0142715 | A1* | 6/2010 | Goldstein | G06F 17/30743 381/56 |
| 2011/0163892 | A1 | 7/2011 | Groves et al. | |

FOREIGN PATENT DOCUMENTS

| | | |
|---|---|---|
| CN | 102708690 A | 10/2012 |
| CN | 203027501 U | 6/2013 |
| CN | 104008644 A | 8/2014 |
| JP | 2013049964 A | 3/2013 |
| KR | 20120055783 A | 6/2012 |
| WO | 2013150349 A1 | 10/2013 |

OTHER PUBLICATIONS

I.J. Bateman et al, "Applying Geographical Information Systems (GIS) to Environmental and Resource Economics", Environmental and Resource Economics 22: 219-269, 2002 (Year: 2002).*

"Office Action Issued in Chinese Patent Application No. 201480063989.9", dated May 16, 2018, 10 Pages.

"Office Action Issued in European patent Application No. 14901770.9", dated Jan. 20, 2017, 4 Pages.

"Office Action Issued in European Patent Application No. 14901770.9", dated Jul. 11, 2017, 5 Pages.

"Search Report Issued in European Patent Application No. 14901770.9", dated May 22, 2017, 4 Pages.

"Office Action and Search Report Issued in Chinese Patent Application No. 201480063989.9", dated Jul. 3, 2017, 12 Pages.

Maisonneuve, et al. "NoiseTube: Measuring and Mapping Noise Pollution with Mobile Phones", In Proceedings of 4th International ICSC Symposium, May 28, 2009, pp. 215-228.

"International Search Report and Written Opinion Issued in PCT Application No. PCT/CN2014/086367", dated Jun. 23, 2015, 11 Pages.

Rana, et al., "Ear-Phone: An End-to-End Participatory Urban Noise Mapping System", In Proceedings of the 9th ACM/IEEE International Conference on Information Processing in Sensor Networks, Apr. 12, 2010, pp. 105-116.

"Nyc Open Data", Retrieved From «https://nycopendata.socrata.com/Social-Services/311-Service-Requests-from-2010-to-Present/erm2-nwe9» Retrieved on: May 7, 2014, 1 Page.

Couvreur, Christophe, "Environmental Sound Recognition: A Statistical Approach", In PhD Thesis of Faculté Polytechnique de, Jun. 1997, 3 Pages.

D'Hondt, et al., "Participatory Noise Mapping", In Proceeding of the 9th International Conference on Pervasive Computing, Jun. 2011, 4 Pages.

Filipponi, et al., "Data Collection in Wireless Sensor Networks for Noise Pollution Monitoring", In Proceedings of the 4th IEEE International Conference on Distributed Computing in Sensor Systems, Jun. 11, 2008, pp. 1-6.

Gaunard, et al., "Automatic Classification of Environmental Noise Events by Hidden Markov Models", In Proceedings of the 1998 IEEE International Conference on Acoustics, Speech and Signal Processing, vol. 6, May 12, 1998, 4 Pages.

Karatzoglou, et al., "Multiverse Recommendation: N-Dimensional Tensor Factorization for Context-Aware Collaborative Filtering", In Proceedings of the Fourth ACM Conference on Recommender Systems, Sep. 26, 2010, pp. 79-86.

Kolda, et al., "Tensor Decompositions and Applications", In Journal of SIAM Review, vol. 51, Issue 3, Aug. 2009, pp. 455-500.

Ma, et al., "Environmental Noise Classification for Context-Aware Applications", In Proceedings of 14th International Conference on Database and Expert Systems Applications, Sep. 1, 2003, 10 Pages.

Lane, et al., "A Survey of Mobile Phone Sensing", In Journal of IEEE Communications Magazine, vol. 48, Issue 9, Sep. 2010, 11 Pages.

Li, et al., "Classification of General Audio Data for Content-Based Retrieval", In Proceedings of Pattern Recognition Letters, vol. 22, Issue 5, Apr. 2001, 2 Pages.

Lu, et al., "SoundSense: Scalable Sound Sensing for People-Centric Applications on Mobile Phones", In Proceedings of the 7th International Conference on Mobile Systems, Applications, and Services, Jun. 22, 2009, 14 Pages.

Oliver, et al., "Kriging: A Method of Interpolation for Geographical Information Systems", In International Journal of Geographical Information Science, vol. 4, Issue 3, Jul. 1, 1990, 2 Pages.

Pushp, et al., "Poster Abstract: Towards Crowd-Aware Sensing Platform for Metropolitan Environments", In Proceedings of the 10th ACM Conference on Embedded Network Sensor Systems, Nov. 6, 2012, pp. 335-336.

Santini, et al., "First Experiences using Wireless Sensor Networks for Noise Pollution Monitoring", In Proceedings of the Workshop on Real-world Wireless Sensor Networks, Apr. 1, 2008, 5 pages.

Santini, et al., "Wireless Sensor Networks for Environmental Noise Monitoring", In Proceedings of GI/ITG KuVS Fachgespraech Drahtlose Sensornetze, Jul. 2007, 4 Pages.

Stevens, et al., "Crowdsourcing of Pollution Data Using Smartphones", In Proceedings of Workshop on Ubiquitous Crowdsourcing, Sep. 26, 2010, 4 Pages.

Xu, et al., "Crowd++: Unsupervised Speaker Count with Smartphones", In Proceedings of the ACM International Joint Conference on Pervasive and Ubiquitous Computing, Sep. 8, 2013, 10 Pages.

Yang, et al., "Fine-Grained Preference-Aware Location Search Leveraging Crowdsourced Digital Footprints from LBSNs", In Proceedings of the ACM International Joint Conference on Pervasive and Ubiquitous Computing, Sep. 8, 2013, 10 Pages.

Yilmaz, et al., "A Simple and Efficient Sampling Method for Estimating AP and NDCG", In Proceedings of the 31st Annual International ACM SIGIR Conference on Research and Development in Information Retrieval, Jul. 20, 2008, 8 Pages.

Yuan, et al., "Segmentation of Urban Areas using Road Networks", In Microsoft Research Technical Report MSR-TR-2012-65, Jul. 2012, 5 Pages.

Yuan, et al., "Discovering Regions of Different Functions in a City using Human Mobility and POIs", In Proceedings of the 18th ACM SIGKDD International Conference on Knowledge Discovery and Data Mining, Aug. 12, 2012, 9 Pages.

Zhang, et al., "Hoodsquare: Modeling and Recommending Neighborhoods in Location-based Social Networks", In Proceedings of International Conference on Social Computing, SocialCom, Sep. 8, 2013, pp. 1-15.

Zhang, et al., "Sensing the Pulse of Urban Refueling Behavior", In Proceedings of ACM International Joint Conference on Pervasive and Ubiquitous Computing, Sep. 8, 2013, 10 Pages.

Zheng, et al., "Collaborative Filtering Meets Mobile Recommendation: A User-centered Approach", In Proceedings of the Twenty-Fourth AAAI Conference on Artificial Intelligence, Jul. 11, 2010, 6 Pages.

Zheng, et al., "Towards Mobile Intelligence: Learning from GPS History Data for Collaborative Recommendation", In Journal of Artificial Intelligence, vol. 184-185, Jun. 2012, pp. 17-37.

Zheng, et al., "Urban Computing: Concepts, Methodologies, and Applications", In Proceedings of ACM Transaction on Intelligent Systems and Technology, vol. 5, Issue 3, Oct. 1, 2014, 55 Pages.

Garcia-Marti, et al., "Noise Battle: A Gamified application for Environmental Noise Monitoring in Urban Areas", In Proceedings of Action and Interaction in Volunteered Geographic Information, May 14, 2013, 5 Pages.

Foerster, et al., "Integrating Volunteered Human Sensor Data Into Crowd-sourced Platforms: A Use Case on Noise Pollution Monitoring and OpenStreetMap", In Proceedings of Innovations in Sharing Environmental Observations and Information, Oct. 5, 2011, 5 pages.

(56) References Cited

OTHER PUBLICATIONS

Radu, et al., "Acoustic Noise Pollution Monitoring in an Urban Environment Using a VANET Network", In IEEE International Conference on Automation Quality and Testing Robotics, May 24, 2012, 5 Pages.

Zhou, Min, "GIS-based City Central Area Noise Mapping", In Proceedings of International Conference on Remote Sensing, Environment and Transportation Engineering, Jun. 24, 2011, pp. 2192-2195.

Ruge, et al., "SoundOfTheCity—Continuous Noise Monitoring for a Healthy City", In Proceedings of 5th International Workshop on Smart Environments and Ambient Intelligence, Mar. 18, 2013, pp. 670-675.

Eldien, Hany Hossam, "Noise Mapping in Urban Environments: Application at Suez City Center", In IEEE International Conference on Computers & Industrial Engineering, Jul. 6, 2009, pp. 1722-1727.

"Office Action Issued in European patent Application No. 14901770.9", dated Feb. 20, 2019, 5 Pages.

\* cited by examiner

Noise sample 300
    category/level 302
    location 304
    time 306

Road network information 320
Road segment 322
    end point 324
    end point 326
    list 328 of additional points
    length 330
    level 332
    direction 334
    lanes 336
    region 338

FIG.3

MEASURING AND DIAGNOSING NOISE IN AN URBAN ENVIRONMENT

CROSS-REFERENCE TO RELATED APPLCIATIONS

Pursuant to 35 U.S.C. § 371, this application is the United States National Stage Application of International Patent Application No. PCT/CN2014/086367, filed Sep. 12, 2014.

BACKGROUND

Urban environments have many sources of noise. The ability to make policy decisions about how to reduce noise is premised on an assumption that sources and types of noise, and likely effects of policy decisions on them, can be predicted. Such predictions in turn are dependent on reasonably accurate measurements of patterns of actual noise levels and categories of noise at different times of day and in different locations.

SUMMARY

This Summary is provided to introduce a selection of concepts in a simplified form that are further described below in the Detailed Description. This Summary is intended neither to identify key or essential features, nor to limit the scope, of the claimed subject matter.

A computer system measures noise in an urban environment using data records providing a location of a noise, a time stamp associated with the noise, and a noise category. Such data records are sparse with respect to both locations and time. The computer system also accesses other information that defines correlations of among different locations and among different time slots. Such correlation data can include geographic information and historical sample data. By applying this correlated information to the sparse data records about noise, the computer system can derive noise level and noise category information over a larger geographical area. Such information can be provided continually based on received data records about noise, typically in a matter of minutes after receiving the noise data for any given time slot.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of illustrative examples of data structures.

DETAILED DESCRIPTION

The following section describes an example implementation of a computer system that measures noise in an urban environment.

Figure 1:
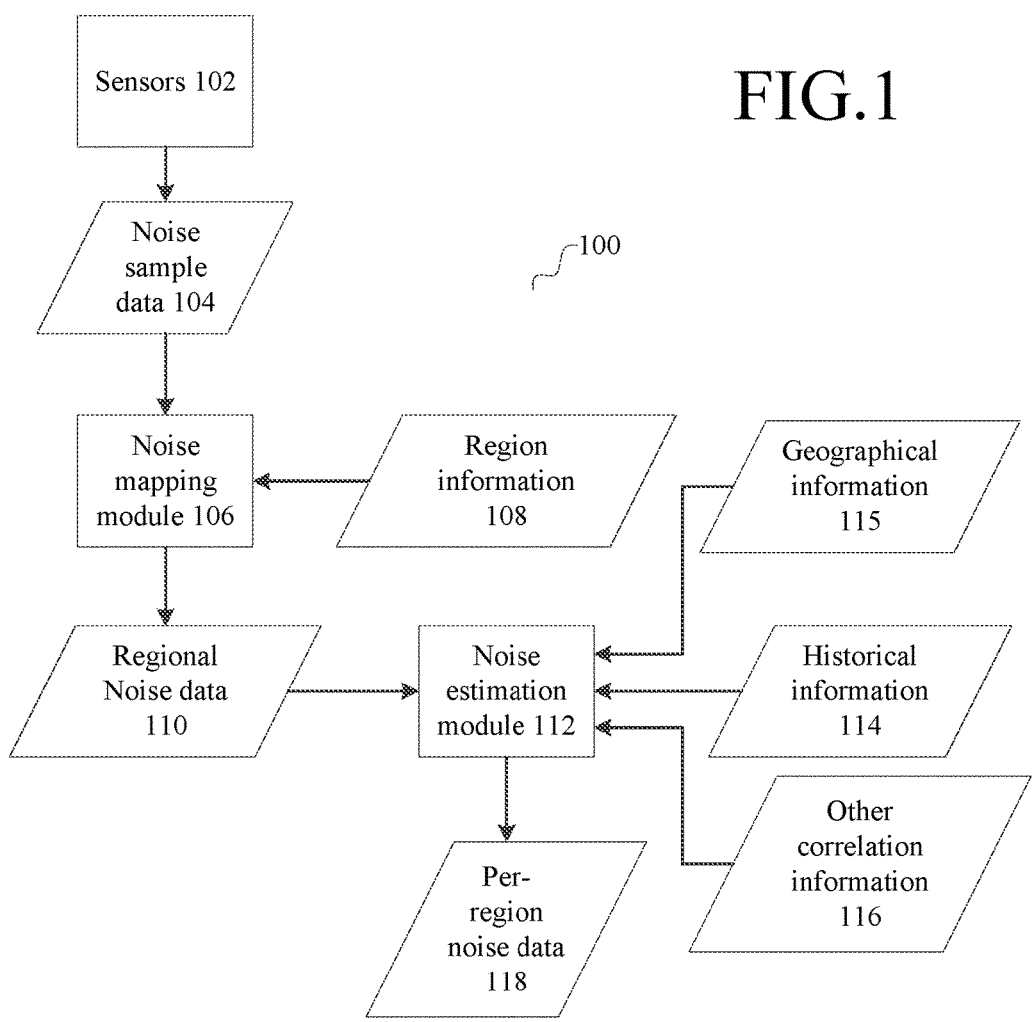
FIG. 1 is a block diagram of an example application environment in which a computer system supports measuring noise in an urban environment.

A computer system 100 measures noise in regions of an urban environment using sample data 104, in which each sample associates a noise category or level with a location and a point of time or time slot among a plurality of time slots in day. This sample data is shown in FIG. 1 as current noise sample data 104. The current noise sample data 104 represents a current sampling of noise (e.g., noise category or level, location and time) occurring in the urban environment.

The noise sample data 104 can be obtained in many ways using a variety of sensors 102. In one implementation, so-called "311" data is used. A "311" system, such as used in New York City, allows individuals to make telephone calls to lodge complaints, including noise. When related to a noise complaint, the individual making a call provides inputs which are stored as data records which include a date and time, location and category of noise. Such data recorded for each call provides a noise sample to the computer system in real time. Data from multiple calls are collected and stored in computer storage as current noise sample data 102 for access by the computer system. Various other types of sensors can be used to capture noise samples. The computer system 100 uses the noise sample data 104 to, in turn, compute per region, per time-slot, per-category noise information and provide these measures in real time.

The area within which noise data is gathered is divided in a plurality of regions, indicated as region information 108. Such a set of regions can be derived, for example, from available geographical information 115, such as postal codes or road network information. Using road network information, a map segmentation algorithm (not shown) can be applied to a graph defined by a road network to define regions. For example, such a segmentation algorithm can define regions by the locations of major road segments. The road network information can be defined, for example, by a set of interconnected road segments, where each road segment is represented by data including at least two terminal points in the geospatial coordinate set and a length.

The current noise sample data 104 and regions 108 are inputs to noise mapping module 106 which maps each noise sample to a region within a time slot. The noise mapping module outputs a matrix, for a given time slot, for the noise data for each region, indicated in FIG. 1 as regional noise data 110.

The noise sample data 104, and subsequently regional noise data 110, are sparse with respect to both regions and time slots. The computer system uses this sparse data to measure noise in each region and time slot, including regions and time slots for which there is no sample data. To perform such a computation, the computer system also accesses other information that defines correlations among different regions and among different time slots. Such correlation data can include, for example, geographical information 115 and historical sample data 114 or yet other correlation data 116.

An example of such correlation data is geographical information 115. As an example, road network information can be augmented to include other geographical information for each road segment in addition to the endpoints of the road segment. Such additional geographical information can include, but is not limited to, a set of intermediate points describing the road segment, a type (e.g., highway, urban street), a number of lanes, and a direction (e.g., one-way or bidirectional). Geographical information can include points of interest in the geographic area. A point of interest can be represented, for example, by at least a geospatial coordinate set or a road segment, with which the point of interest is associated, and other attributes, such as a name, category, address, and the like.

As another example of correlation data, the regional noise data 110 can be collected over time, by time slot, to provide historical information 114.

As an example of other correlation data 116, user location data for location based social networks can be used. User location data can be derived from location based social networks, and provides data indicating a number of people in a given region. Such data indicates human mobility within the urban environment, which is correlated to noise. Such user location data is de-identified data, and can include a user count per region per time slot. Such information can be provided by location based social networks, such as the Gowalla network and the Foursquare network. The user location data can include categories similar to those used for points of interest. Actual traffic data or data from other location sensors also could be used in place of user location data.

The regional noise data 110 and correlation data, such as historical information 114, geographical information 115 and other data 116, are inputs to a noise estimation module 112. The noise estimation module 112 processes its inputs to generate estimates of per-region noise 118 for each region within the current time slot, in a manner described in more detail below. In particular, the instantaneous noise information is a sparse data set representing noise events in regions during a time slot. Because many of the regions are not covered by the noise sample data during one time slot, the noise sample data is sparse relative to all of the regions. The noise estimation module uses the correlation information from other sources, such as historical information and geographical information, to deal with data sparsity to compute estimates of per-region noise 118 which includes the other regions for which there is no sample data.

Each module of the computer system such as described in FIG. 1 can be implemented using one or more processing units of one or more computers with one or more computer programs processed by the one or more processing units. Such a computer is described in more detail below in connection with FIG. 8. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures. This computer system may be implemented in a distributed computing environment, where different modules can be implemented on different computers that are linked through a communications network. A module in itself can be implemented using multiple computers. In a distributed computing environment, computer programs may be located in both local and remote computer storage media.

A flowchart illustrating an example operation of a computer system such as shown in FIG. 1 will now be described in connection with FIG. 2.

Figure 2:
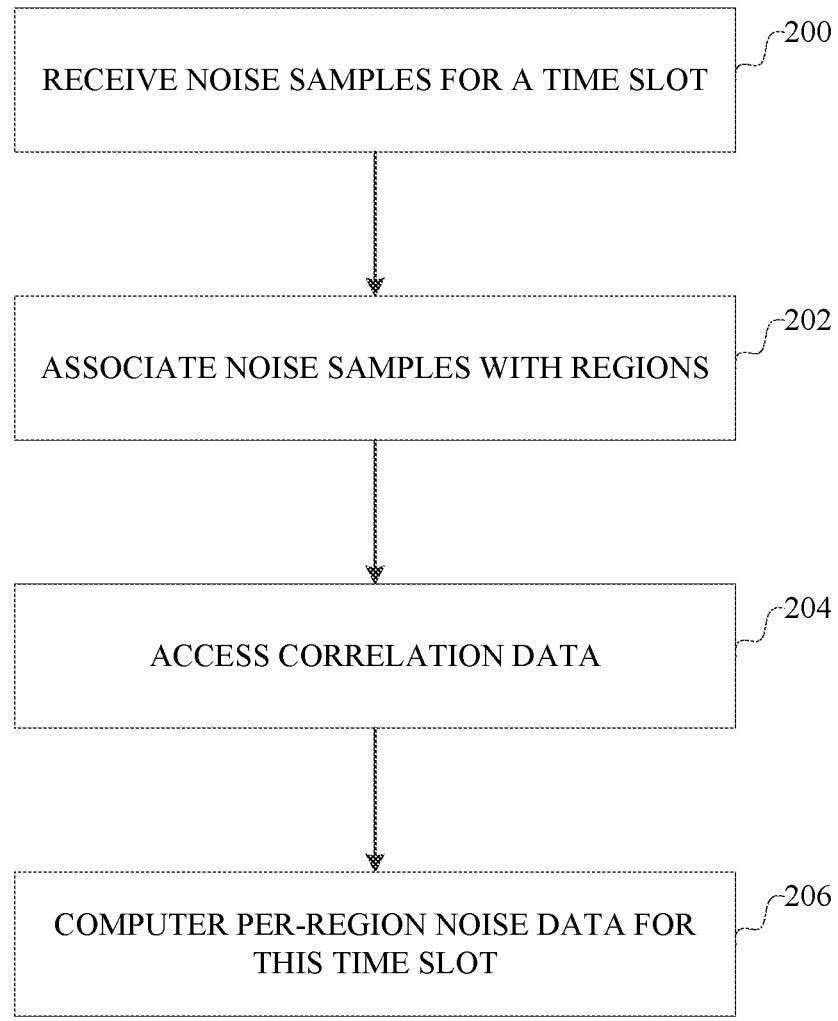
FIG. 2 is a flowchart describing an example process of operation of a computer system such as in FIG. 1.

In FIG. 2, the computer system receives 200 noise sample data, which includes a number of instances of noise over a given time slot. The time slot can be any period of time sufficient to provide several noise samples during the time slot. The noise mapping module associates 202 each noise sample with a region of the urban environment. The result is sparse noise data representing samples of noise in a time slot in a few regions. A noise estimation module accesses 204 correlation data and then generates 206 a noise estimate for each region in the current time slot.

Details of an example implementation of such a computer system will now be described in connection with FIGS. 3-9.

In FIG. 3, example data structures for a computer program are shown for each of the noise sample data 102 and road network information, which is part of the geographical information 115 from which region data 108 can be derived. Such data structures can be implemented in persistent storage, for example in a database or a data file. Such data structures can be implemented in memory. In general, such data structures are in memory for the purposes of computations performed, using the data, by various modules of the computer system.

In FIG. 3, a noise sample 300 is a combination of a noise category 302 or level, a location 304 and a time 306. The time can be in any format, and can represent time of day, such as in the form of hours, minutes and seconds, and optionally can include the date. It is possible to configure a noise sampling system such that the noise sample 300 includes, as its location, one of the regions 108 in which the noise occurred, in which case a noise mapping module 106 can be eliminated.

Also in FIG. 3, road network information 320 can be represented using a set of road segments 322. The set can be represented by, for example, a graph or sorted or unsorted list. Each road segment 322 can be represented by two endpoints 324, 326, and can optionally be represented as a directed edge between those two endpoints. Optionally, a list 328 of additional points describing the road segment (e.g., for a curvy road) can be included. Other information that can be represented includes, but is not limited to, a length 330, a level 332 (e.g., highway, urban street), a direction 334 (e.g., one-way or bidirectional), a number of lanes 336, and the like. Using this information, regions 108 can be defined and additional features to be used in correlation data also can be defined. The region in which a road segment falls also can be stored in the data structure as indicated at 338.

Figure 4:
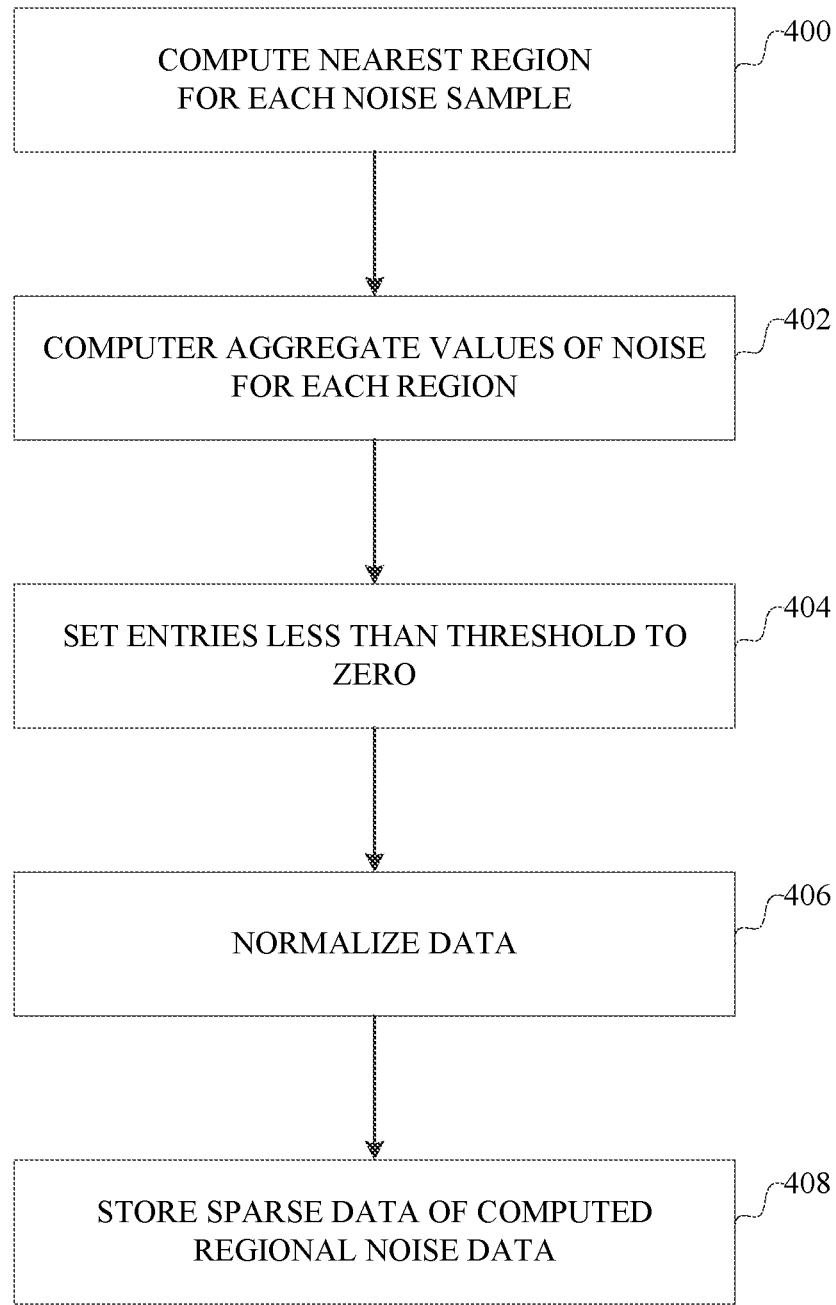
FIG. 4 is a flowchart describing operation of the example implementation of mapping noise samples to regions.

Referring to FIG. 4, noise samples for a given time slot and regions derived from the road network information can be inputs to a noise mapping module. In one implementation described in connection with FIG. 4, the noise mapping module projects each noise sample to a region derived from the road segments in the road network information. In general, the noise mapping module computes 400, for each noise sample, the nearest region with which to associate the noise sample. Data associating a noise sample with its corresponding region can be stored in a data structure such as described above in connection with FIG. 3, or in a separate data structure.

Next, the noise mapping module can compute 402, for each region, an aggregate value representing the noise samples associated with that region. As an example, a matrix for the current time slot is created as a set of entries $A(i, j, k)$, each of which stores a total number of noise samples per category $c_j$ in region $r_i$ and time slot $t_k$. The set of entries over multiple categories, regions and time slots is a three-dimensional matrix A of sparse data, which, using a process as described below, is completed so as to provide a measure of noise conditions for each region in the time slot.

To ensure quality of data, regions in which the number of noise samples is small can be treated as if there is no value. For example, the noise mapping module can set 404 any entry have a value less than a threshold (e.g., 2) to zero. The values in the matrix also can be normalized 406 in the range of 0 to 1.

After computing the regional noise data for a given time slot, the noise mapping module also can store 408 this information, for example in a database or data file, as historic traffic noise data (e.g., to be used as historical information 114 in FIG. 1).

As noted above, regional noise data for a time slot output the by the noise mapping module can be combined with historic noise data, geographical information and other correlation data to compute per-region noise data for the time slot. The historical information is the regional noise data per time slot output for prior time slots by the noise mapping module. The geographical information is a set of features correlated to noise that are determined to be in each region. Some geographical information can be derived from the road network information (FIG. 3). The other correlation information can include the user location information, as will be described in more detail below as well.

Examples of geographical information derived from road network information will now be described. Given the road network information, the road segments within each region can be determined. Such data can be stored for each road segment. From this set of road segments in a region, road network features can be derived. Example road network features considered for this example implementation are the number of intersections (fs) in the region (which is the total number of unique endpoints in the region that are shared by road segments), the total length (fr) of road segments of each level. The major roads bounding the region are used in these computations for the regions. The set of road network features can be represented as a matrix, with a row for each region and a column for each road network feature.

Points of interest also can be part of the geographical information. Features related to the points of interest can be part of the matrix that includes the road network features for each region, with the points of interest information for a region as additional features, i.e., one or more columns, of the matrix. A point of interest can be, for example, any venue located in a region. A point of interest may be associated with a road segment in the road network information or can be associated with a region, for example. In one implementation, for each region, points of interest within the region are identified. This information can be provided, for example, in a preprocessed database of points of interest that represents a point of interest with a region and a category. Features derived for a region based on points of interest can include, for example, a number (fn) of points of interest in the region, a measure of density (fd) of the points of interest in the region, and a distribution (fc) of the points of interest over a set of categories.

Further geographical information also can be included by deriving other features from road network, point of interest or other data. Such features can be included in the matrix of features for a region as one or more columns.

If such features are represented in a matrix for multiple regions, then regions for which the sets of geographical features are similar could have similar noise conditions. Such geographical features thus define a correlation among the regions.

The present invention is not limited to any particular set of geographical features, point of interest features or road network features. Generally speaking, a matrix of values is determined such that regions with similar values are considered to have similar noise conditions, for the purposes of computing per region noise conditions from the sparse noise data described above. In this illustrative example, such geographical features also are generally static information about the regions and can be computed once and/or updated infrequently.

User location information similarly can be gathered to create a matrix of correlation information among time slots and regions. User location information, as noted above, generally includes a set of samples of times and locations. Each sample is mapped to a region and a time slot in a matrix. The value in that cell of the matrix is the number of samples found for that region and time slot. This kind of data exposes potential correlations between regions, because regions with similar population patterns in a time slot likely could have a similar noise pattern. Also this kind of data exposes potential correlations in time slots, because time slots with similar population patterns in the same region likely could have a similar noise pattern. Such user location information, while not generally static, also tends to maintain a same pattern over time in the absence of significant demographic or geographic changes, and thus can be computed infrequently.

The historic noise data also can be used as correlation data, from which another matrix can be derived which shows correlations among noise categories within a region. The matrix has a row for each noise category, and a column for each noise category. The value stored at each row, column location in the matrix is the correlation computed between noise events in one category and noise events in the other category based on the historical noise data. There are a variety of ways to compute such a correlation. While the historic information changes over time, in general the correlations derived from the data are not likely to change significantly is a short time period; thus this correlation information can be computed infrequently as well.

Given the regional noise sample data for a time slot, along with geographic features, user location features and historical noise category correlations, estimates of the noise conditions in all regions in the urban environment then can be computed for the time slot. An example implementation of such computation will now be described in connection with FIGS. 5 and 6.

Using correlation data, in this example the geographical features, user location features and noise category correlations, a context-aware matrix factorization approach is used to compute the estimated noise conditions for each region in a time slot. In particular, matrices built using historical noise data, which model correlations between different noise categories, and matrices built using geographical features, which model correlations between different regions, a matrices built using user location data, which model correlations between different regions and between different time slots, provide context to the problem of completing the sparse data matrix of noise data built from the sample data for the most recent time slots. The combination of matrices can be factorized to complete the sparse data matrix and provide a measure of noise conditions for all regions, including regions for which there are no data samples.

Figures 5, 6:
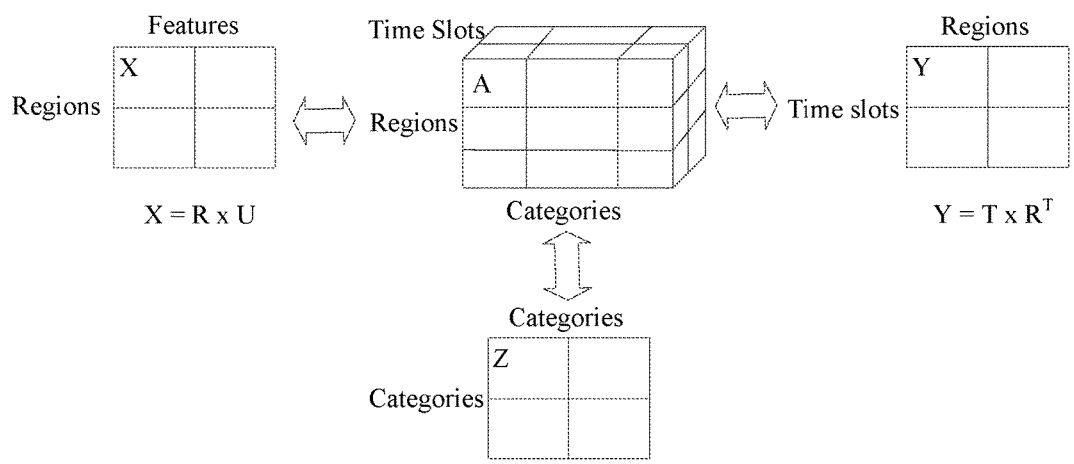
FIGS. 5 and 6 are diagrams example matrices used to compute noise conditions.

In FIG. 5, there are three matrices X, Y, and Z. Thus, matrix X is the concatenation of per-region geographical features, providing for each region ri, the geographical features of that region (in this example implementation fs, fr, fn, fd and fc, as described above). Matrix Y is the concatenation of the number of users (dik) located in each region (k) in each of a set of time slots (i). For example, a matrix Y representing an entire day can be built in advance in memory, and, for any given computation a subset of this matrix can be used. Matrix Z is the set of correlations computed among the noise categories from the historical noise data.

As shown in FIG. 6, current noise conditions in each region are estimated by filling in the missing values in matrix A using data from matrices X, Y and Z. In particular, matrix A can be decomposed collaboratively with matrices X, Y and Z to improve the accuracy of the resulting completed matrix A.

To perform such a collaborative decomposition of these matrices, the following is computed:

First the decomposition of Matrix A is defined using the following objective function:

$$\mathcal{L}(S, R, C, T, U) = \frac{1}{2}\|\mathcal{A} - S\times_R R \times_C C \times_T T\|^2 + \frac{\lambda_1}{2}\|X - RU\|^2 + \frac{\lambda_2}{2}\mathrm{tr}(C^T L_Z C) + \frac{\lambda_3}{2}\|Y - TR^T\|^2 + \frac{\lambda_4}{2}(\|S\|^2 + \|R\|^2 + \|C\|^2 + \|T\|^2 + \|U\|^2) \quad (4)$$

Matrices X and Y are decomposed as follows:

$$X = R \times U \text{ and } Y = T \times R^T$$

Thus, matrices A and X share matrix R. Matrices A and Y share matrices R and T. The dense representation of X, Y and Z contributes to the generation of relatively accurate values for the low rank matrices R, C and T. Matrix A then can be computed by:

$$\mathcal{A}_{rec} = S \times_R R \times_C C \times_T T.$$

Figure 7:
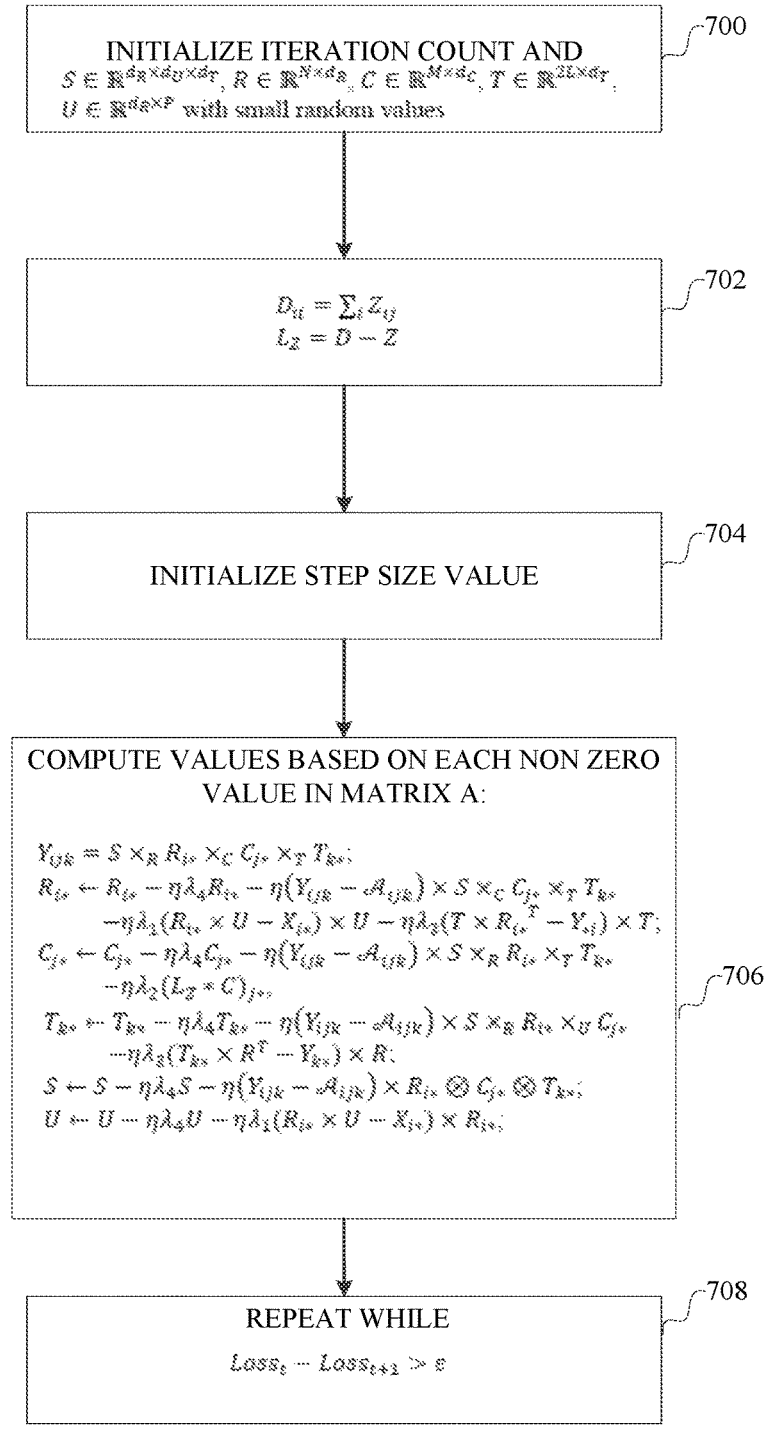
FIG. 7 is a flowchart describing operation of an example implementation of computing noise in a region for a time slot.

The objective function above can be solved through an iterative local optimization process, such as by using a gradient descent algorithm, as shown in FIG. 7. The implementation shown in FIG. 7 is an element-wise optimization algorithm which updates eave entry in the matrix A independently.

For example, an iterative process can be implemented. The current iteration is represented by a variable, e.g., t, which is initialized at 700, e.g., to t=1, along with other variables in the computation, as indicated in 702. A step size for the gradient descent algorithm is set at 704. In each iteration, the non-zero values in Matrix A are processed to compute values for the low rank matrices R, C and T, and S and U are updated, at 706. The current iteration counter is incremented, and processing repeats, as indicated at 708 unless the error difference between the last two iterations is below a threshold. At this stage, matrices R, C and T can be output and used to finalize the Matrix A.

Using an implementation such as described above, sparse noise sample data can be used in combination with correlation data to estimate noise conditions for a time slot in regions of an urban environment, including noise conditions for regions in which no noise samples are received in that time slot. The noise sample data can be processed by the computer system to perform a real time measurement for data collected within a time slot. The computer system can compute the noise conditions within a time slot to provide the measures in real time.

Accordingly, in one aspect, a computer system measures noise conditions in regions of an urban environment. The computer system includes computer storage in which noise sample data is stored. The sample data associates occurrences of noise with locations and points in time. The sample data can be derived, for example, from caller complaint data received over a telephone system. Further, the computer storage includes correlation data defining correlations among regions, time slots and noise categories. One or more processing units are programmed to access the computer storage to process the noise sample data using the correlation data to provide an output describing, for each region in the urban environment, at least a noise condition for the region for at least the current time slot.

In another aspect, a computer-implemented process includes receiving noise sample data associating noise at locations at points in time. The noise sample data can be derived from caller complaint data received through a telephone system. Correlation data defining correlations among regions, time slots and/or noise categories is accessed. The sample data is processed using the correlation data to provide an output describing, for each region in the urban environment, at least a noise condition for the region for at least the current time slot.

In another aspect, the computer system includes a means for receiving noise sample data. The noise sample data associates a noise with a location and a point in time. The computer system includes a means for processing the noise sample data using the correlation data to provide an output describing, for each region, at least noise conditions for the region for the current time slot. The correlation data can define correlations among regions, time slots and/or noise categories.

In another aspect, a process includes receiving noise sample data associating a noise with a location and point in time. The process includes processing the noise sample data using correlation data to provide an output describing, for each region, at least noise conditions for the region for at least the current time slot. The correlation data can define correlations among regions, time slots and/or noise categories.

Any of the foregoing aspects can be embodied in computer program instructions stored on one or more computer storage media which, when processed by a computer, configure the computer to implement a process or configure a general purpose computer system to implement a computer system.

Advantageously, such a computer system or process can process noise sample data for a time slot to produce an output for the time slot in real time within one time slot.

In any of the foregoing aspects, the correlation data can include road features for each of a plurality of road segments in the region. The correlation data can include information about points of interest in each region. The correlation data can further include correlations among noise categories derived from historic noise sample data. The correlation data can further include user location data which correlates time slots and/or regions by user activity.

Processing the correlation data and the noise sample data in any of the foregoing aspects can include factorizing matrices to determine noise condition for regions where noise samples have not been received in the current time slot.

In any of the foregoing aspects, the processing of the noise sample data by the one or more processing units for a current time slot occurs in real time within a time slot of receiving the noise sample data.

Figure 8:
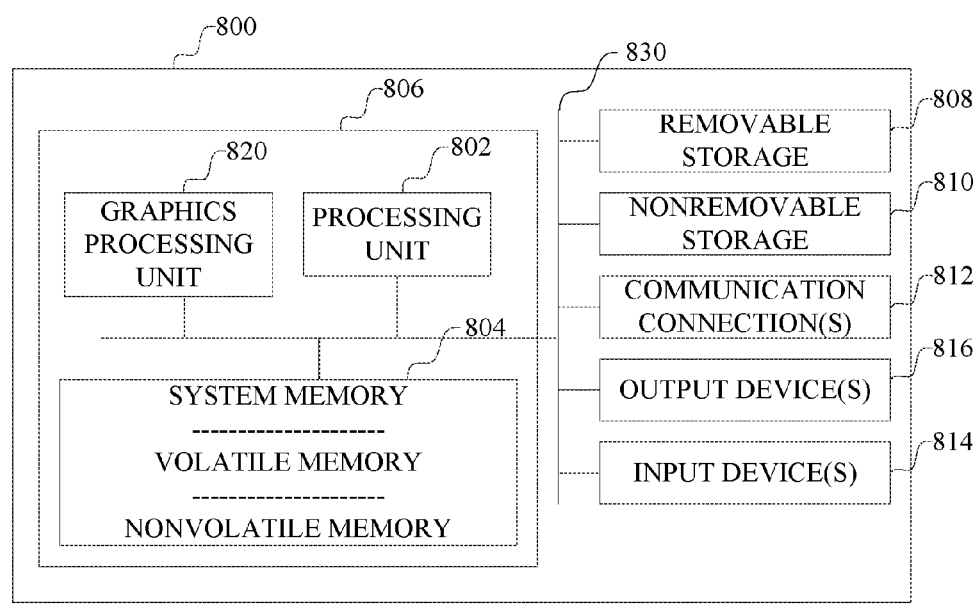
FIG. 8 is a block diagram of an example computer with which components of such a system can be implemented.

Having now described an example implementation, FIG. 8 illustrates an example computer with which the various components of the system of FIGS. 1-7 can be implemented. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, and distributed computing environments that include any of the above types of computers or devices, and the like.

With reference to FIG. 8, an example computer 800 includes at least one processing unit 802 and memory 804. The computer can have multiple processing units 802. A processing unit 802 can include one or more processing cores (not shown) that operate independently of each other. Additional co-processing units, such as graphics processing unit 820, also can be present in the computer. The memory 804 may be volatile (such as dynamic random access memory (DRAM) or other random access memory device), non-volatile (such as a read-only memory, flash memory, and the like) or some combination of the two. This configuration of memory is illustrated in FIG. 8 by dashed line 806. The computer 800 may include additional storage (removable and/or non-removable) including, but not limited to, magnetically-recorded or optically-recorded disks or tape. Such additional storage is illustrated in FIG. 8 by removable storage 808 and non-removable storage 810. The various components in FIG. 8 are generally interconnected by an interconnection mechanism, such as one or more buses 830.

A computer storage medium is any medium in which data can be stored in and retrieved from addressable physical storage locations by the computer. Computer storage media includes volatile and nonvolatile memory, and removable and non-removable storage media. Memory 804 and 806, removable storage 808 and non-removable storage 810 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 800 may also include communications connection(s) 812 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 812 are devices, such as a network interface or radio transmitter, that interface with the communication media to transmit data over and receive data from communication media.

Computer 800 may have various input device(s) 814 such as a keyboard, mouse, pen, camera, touch input device, and so on. Output device(s) 816 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 810, communication connections 812, output devices 816 and input devices 814 can be integrated within a housing with the rest of the computer, or can be connected through input/output interface devices on the computer, in which case the reference numbers 810, 812, 814 and 816 can indicate either the interface for connection to a device or the device itself as the case may be.

A computer system generally includes an operating system, which is a computer program running on a computer that manages access to the various resources of the computer by applications. There may be multiple applications. The various resources include the memory, storage, input devices and output devices, such as display devices and input devices as shown in FIG. 8.

Each module of a computer system such as described in FIGS. 1-9 above, and which operates on a computer, can be implemented using one or more processing units of a computer with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The invention may be embodied as a computer system, as any individual component of such a computer system, as a process performed by such a computer system or any individual component of such a computer system, or as an article of manufacture including computer storage with computer program instructions are stored and which, when processed by computers, configure those computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system for measuring noise conditions in regions of an urban environment, comprising:
   computer storage comprising:
      noise sample data associating a noise with a location and a point in time in a plurality of time slots, wherein at least one location does not have noise sample data for at least one time slot;
      correlation data defining correlations among regions indicating regions which are geographically similar and temporal correlations among the plurality of time slots indicating time slots having similar noise conditions;
   one or more processing units programmed to access the computer storage to process the sample data using the correlation data to provide an output describing, for each region, at least a noise condition for the region for at least the current time slot, by:
      computing data comprising at least the noise condition for locations having noise sample data in the current time slot; and
      applying the correlation data to compute at least the noise condition for locations not having sample data in the current time slot.

2. The computer system of claim 1, wherein the correlation data comprises road features for each region.

3. The computer system of claim 2, wherein the road features comprise a number of intersections in the region.

4. The computer system of claim 1, wherein the correlation data comprises correlations between noise categories derived from historic noise sample data.

5. The computer system of claim 1, wherein the correlation data comprises user location data providing a number of individuals in a region in a time slot.

6. The computer system of claim 1, wherein the noise sample data includes a matrix of per-region geographical features and a matrix of users located in each region in each of a set of time slots and wherein processing the sample data using the correlation data includes factorizing the matrices to determine noise conditions for other regions where noise samples have not been received in the current time slot.

7. The computer system of claim 1, wherein the processing of the sample data by the one or more processing units for a current time slot occurs in real time within a time slot of receiving the sample data.

8. The computer system of claim 1, wherein the noise sample data comprises called complaint information received through a telephone system and providing a noise category, time and location.

9. The computer system of claim 1, wherein the correlation data includes data derived from user check-in information for a social network.

10. The computer system of claim 1, wherein the correlation data includes traffic data received through sensors.

11. A computer-implemented process comprising:
   receiving noise sample data associating noise with a location and a point in time in a plurality of time slots, wherein at least one location does not have noise sample data for at least one time slot;
   accessing correlation data defining correlations among regions indicating regions which are geographically similar and temporal correlations among the plurality of time slots indicating time slots having similar noise conditions;
   processing the noise sample data using the correlation data to provide an output describing, for each region, at least noise conditions for the region for at least the current time slot, by:
      computing data comprising at least the noise condition for locations having noise sample data in the current time slot; and
      applying the correlation data to compute at least the noise condition for locations not having sample data in the current time slot.

12. The computer-implemented process of claim 11, wherein the correlation data comprises road features for each region.

13. The computer-implemented process of claim 12, wherein the road features comprise a number of intersections in the region.

14. The computer-implemented process of claim 11, wherein the correlation data comprises correlations between noise categories derived from historic noise sample data.

15. An article of manufacture, comprising:
   one or more computer storage media comprising at least one of a memory device and a storage device;
   computer program instructions stored on the one or more computer storage media which, when processed by a computer, configure the computer to implement a process, comprising:
      receiving noise sample data associating noise with a location and a point in time in a plurality of time slots, wherein at least one location does not have noise sample data for at least one time slot;
      accessing correlation data defining correlations among regions indicating regions which are geographically similar and temporal correlations among the plurality of time slots indicating time slots having similar noise conditions;
      processing the noise sample data using the correlation data to provide an output describing, for each region, at least noise conditions for the region for at least the current time slot, by:
         computing data comprising at least the noise condition for locations having noise sample data in the current time slot; and
         applying the correlation data to compute at least the noise condition for locations not having sample data in the current time slot.

16. The article of manufacture of claim 15, wherein the correlation data comprises correlations between noise categories derived from historic noise sample data.

17. The article of manufacture of claim 15, wherein the correlation data comprises user location data providing a number of individuals in a region in a time slot.

18. The article of manufacture of claim 15, wherein the processing of the sample data by the one or more processing units for a current time slot occurs in real time within a time slot of receiving the sample data.

19. The article of manufacture of claim 15, wherein the noise sample data comprises called complaint information received through a telephone system and providing a noise category, time and location.

20. The article of manufacture of claim 15, wherein the correlation data includes traffic data received through sensors.

* * * * *